J. G. GORGEN.
METER SEAL.
APPLICATION FILED JAN. 20, 1914.

1,119,594.

Patented Dec. 1, 1914.

WITNESSES
G. Robert Thomas
A. L. Kitchin.

INVENTOR
John G. Gorgen
BY Munn & Co
ATTORNEYS

UNITED STATES PATENT OFFICE.

JOHN GEORGE GORGEN, OF NEW YORK, N. Y.

METER-SEAL.

1,119,594.  Specification of Letters Patent.  Patented Dec. 1, 1914.

Application filed January 20, 1914. Serial No. 813,200.

*To all whom it may concern:*

Be it known that I, JOHN G. GORGEN, a subject of the Emperor of Germany, and a resident of the city of New York, borough of Manhattan, county and State of New York, have invented a new and Improved Meter-Seal, of which the following is a full, clear, and exact description.

This invention relates to improvements in seals, and particularly to seals for meters, and has for an object to provide an improved structure which must be destroyed before the meter can be opened.

Another object of the invention is to provide a seal which can be readily applied, and also readily removed by breaking, the structure being such that the broken parts cannot be disengaged.

In carrying out the object of the invention it will be evident that the seal can be applied in many places, but it is particularly adapted for seals for meters, as for instance an electric meter where an access to the interior will allow a person to manipulate the meter and set the same at any desired point. In order to prevent the unauthorized manipulation of the meter seals are placed in position. The seal forming the present invention is arranged so as to be readily placed in position, and also readily removed by breaking certain parts, but after once removed new parts cannot be provided, so that the old seal must be entirely discarded.

Figure 1:
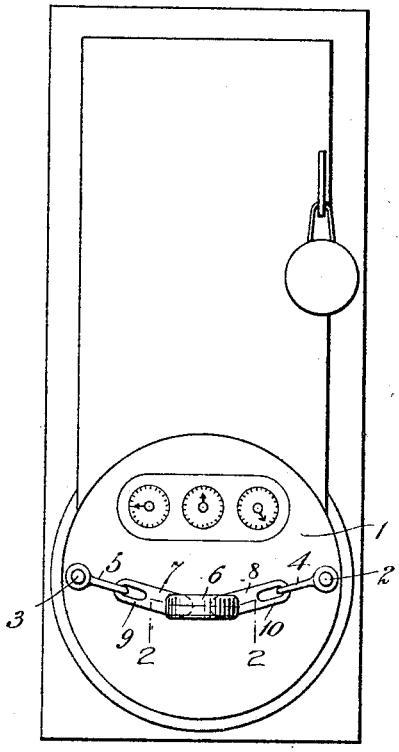
Figure 2:
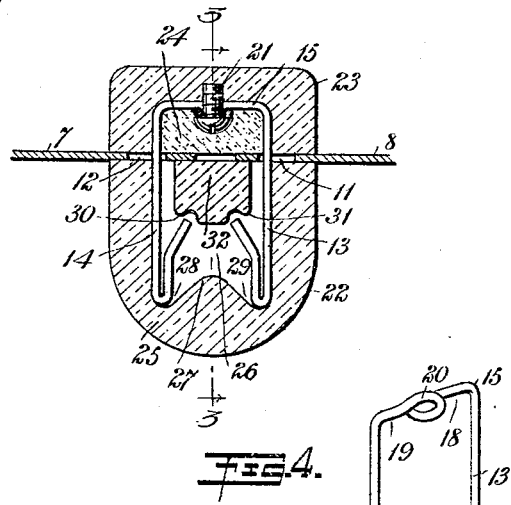
Figure 3:
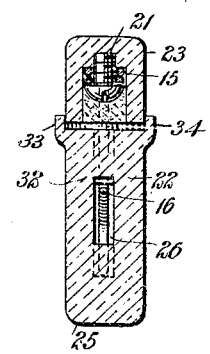
Figure 4:
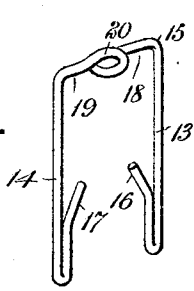

In the accompanying drawings:—Figure 1 is a plan view of a meter and a suitable support therefor, a seal embodying the invention being applied to the meter; Fig. 2 is a section through the seal shown in Fig. 1, the same being taken on line 2—2, and shown on an enlarged scale; Fig. 3 is a section through Fig. 2 approximately on line 3—3; Fig. 4 is a detailed perspective view of the locking wire or bar.

Referring to the accompanying drawings by numeral 1 indicates a meter of any desired kind which has arranged thereon guiding posts 2 and 3. The guiding posts 2 and 3 carry yokes 4 and 5 having threaded eyelets which are screwed over the posts 2 and 3 for clamping in place the base plate of the meter 1. The construction of meter 1, posts 2 and 3, and the yokes 4 and 5 form no part of the present invention except in connection with the seal 6 and the connecting links 7 and 8. The links 7 and 8 are preferably made from aluminum, and are formed with slots 9 and 10 for applying to the yokes or removing the same from the yokes. The adjacent ends of links 7 and 8 are provided with slots 11 and 12 (Fig. 2) through which the arms 13 and 14 of locking bar 15 project. Locking bar 15 is formed with arms 13 and 14 having spring extensions 16 and 17 at one end and connecting members 18 and 19 at the opposite end, connecting members 18 and 19 forming a loop 20 for receiving a retaining screw 21. The locking bar 15 is arranged in the casing 22, and is rigidly secured to the base 23 of casing 22 by a screw 21, and also by a bed of plaster of Paris, cement, or the like, the same being indicated at 24. The top portion 25 of casing 22 is formed with a chamber 26 for receiving part of the arms 13 and 14 and the spring extensions 16 and 17 are clearly shown in Fig. 2. One end of this chamber is formed with a raised portion 27, whereby depressed portions 28 and 29 are presented in which the extreme ends of arms 13 and 14 are adapted to fit. The spring extensions 16 and 17 when forced into position are designed to snap over the projections 30 and 31 of a central lug 32, which lug is formed integral with the top portion 25.

In manufacturing the seals the base 23 is made separate from the top 25, and the locking bar 15 is connected therewith as described, but is not inserted into the top 25 until after the links 7 and 8 have been forced over the spring members 16 and 17. This of course is done when the seal is being applied and then the top member 25 is forced over the arms 13 and 14 until spring members 16 and 17 spring past extensions 30 and 31, as shown in Fig. 2. When this is done the seal is in place and cannot be removed without breaking certain of the parts. In case the casing 22 which is preferably made of refractory material is broken the same cannot of course be again applied. If, however, the base 23 is pulled away from top portion 25 as far as possible and arms 13 and 14 broken, the seal cannot be applied, as the portion of the arms 23 and 24 carrying springs 16 and 17 holds the arms in place and no new arms can be placed in position while the old ones remain in place. The top portion 25 is provided with flanges 33 and 34 so as to overlap the base 23, as shown in Fig. 3, whereby the arms 13 and 14 cannot be broken until at least one of these flanges have been broken. The fact that a flange is broken indicates that the seal is not to be used as the same has been opened. In this way no tampering with the seal will pass unnoticed as no tool can reach any of the interior parts without breaking the same.

What I claim is:—

1. In a seal of the class described, a refractory casing comprising a base and a top member, said top member having a pair of apertures merging into a central chamber, a locking bar rigidly secured to said base formed with arms having spring members, said arms extending through said apertures, and said spring members snapping into said chamber, whereby the base and the top member cannot be separated without breaking, and apertured links between the base and top and through which the members of the locking bar pass, whereby said parts cannot be removed without breaking said links or said seal.

2. In a seal of the class described, a casing formed of a base and a top adapted to receive between them attaching means, the base having a recess and the top a chamber from which lead two apertures, and a locking bar for holding the base and top together with the attaching means between them, said bar having arms connected at one end and provided with spring members at their free ends, the locking bar being secured in the recess of the base and having its arms extending through the apertures of the top into the chamber thereof.

3. In a seal of the character described a casing formed of a base and a top, the base having a recess and the top a chamber and apertures leading from said chamber, a locking bar having arms connected together at one end and spring members at the free ends, the connecting member of the arms being formed with an eye and arranged in the recess of the base, and a screw passing through the said eye into the base.

In testimony whereof I have signed my name to this specification in the presence of two subscribing witnesses.

JOHN GEORGE GORGEN.

Witnesses:
WALTER LAWRANCE,
ANNIE LAWRANCE.

Copies of this patent may be obtained for five cents each, by addressing the "Commissioner of Patents, Washington, D. C."